United States Patent

Takeuchi et al.

[11] Patent Number: 6,064,462
[45] Date of Patent: May 16, 2000

[54] INSPECTING METHOD AND INSPECTING APPARATUS FOR LIQUID CRYSTAL DISPLAY PANEL WHEREBY THE CELL GAP IS INSPECTED

[75] Inventors: Kuniyoshi Takeuchi, Kanagawa; Yasunori Sato, Aichi, both of Japan

[73] Assignee: Sony Corporation, Tokyo, Japan

[21] Appl. No.: 09/354,430

[22] Filed: Jul. 16, 1999

[30] Foreign Application Priority Data

Jul. 21, 1998 [JP] Japan .................................. 10-205371
May 21, 1999 [JP] Japan .................................. 11-141895
May 24, 1999 [JP] Japan .................................. 11-143961

[51] Int. Cl.[7] ........................................................ G02F 1/13
[52] U.S. Cl. ........................................... 349/192; 345/125
[58] Field of Search ....................... 349/192; 250/559.46, 250/559.42; 324/770; 348/125, 131

[56] References Cited

U.S. PATENT DOCUMENTS 5,696,550  12/1997  Aoke et al. .............................. 348/125

FOREIGN PATENT DOCUMENTS 10096681  4/1988  Japan .............................. G01M 11/00

*Primary Examiner*—James A. Dudek
*Attorney, Agent, or Firm*—Limbach & Limbach L.L.P.

[57] ABSTRACT

The invention has an object of automating the inspection of cell-gaps of a liquid crystal display panel. An RGB image formed on the surface of a liquid crystal display panel (15) to be inspected is picked up with a CCD camera (17), and color non-uniformity is analyzed by an image processing unit (18), thereby to inspect the non-uniformity of the cell-gap.

4 Claims, 9 Drawing Sheets

(Unit mm)

(a) Sample 1

(b) Sample 2

(c) Sample 3

(d) Sample 4

(e) Sample 5

(f) Sample 6

(g) Samle 7

(h) Sample 8

(i) Sample 9

(j) Sample 10

(k) Sample 11

(a) Sample 1

(b) Sample 2

(c) Sample 3

(d) Sample 4

(e) Sample 5

(f) Sample 6

(g) Sample 7

(h) Sample 8

(i) Sample 9

(j) Sample 10

(k) Sample 11

INSPECTING METHOD AND INSPECTING APPARATUS FOR LIQUID CRYSTAL DISPLAY PANEL WHEREBY THE CELL GAP IS INSPECTED

BACKGROUND OF THE INVENTION

1. Field of the Invention

The present invention relates to an inspecting method and an inspecting apparatus for a liquid crystal display panel, for inspecting non-uniformity of a gap between two glass plates that hold a liquid crystal of a liquid crystal display panel.

2. Description of the Related Art

At first, an example of a structure of an LCD (liquid crystal display) panel will be briefly explained below with reference to FIG. 1.

As shown in FIG. 1, an LCD panel 1 has a liquid crystal material 3 sealed between two glass plates 2a and 2b, and has spacers 4 inserted in the liquid crystal material 3 so as to make a gap between the two glass plates 2a and 2b in which the liquid crystal material 3 is sealed uniform.

Further, between the glass plates 2a and 2b, there are also provided orientation films 5a and 5b, transparent electrodes 6a and 6b, a switching element 7 and an RGB color filter 8. The inside of the two glass plates 2a and 2b is sealed at their both outer peripheries with a sealing material 9. The LCD panel 1 is further provided with polarization plates 10a and 10b, a driving IC 11 and a back-light 12.

In the process of manufacturing this LCD panel 1, there arises a case where a gap between the two glass plates 2a and 2b becomes not uniform when the liquid crystal material 3 is charged into this gap.

As a conventional inspecting method for inspecting a gap between the two glass plates 2a and 2b in a manufacturing line of this LCD panel 1, there has been employed a method comprising the steps, for example, of: illuminating the LCD panel 1 to be inspected with a sodium lamp or the like; counting the number of Newton rings appearing on the LCD panel 1 by visual observation; and deciding a level of uniformity based on the number of Newton rings, whereby to decide on a pass or a failure of the LCD panel.

According to this inspecting method, in order to decide a level of uniformity of the gap between the two glass plates 2a and 2b of this LCD panel, the center part of Newton rings is pressed by a projected object. When the inside liquid crystal tends to spread out by this pressing, a decision is made that the panel surface is convex. When the inside liquid crystal tends to gather together, a decision is made that the panel surface is concave. This conventional inspecting method has not be convenient in that it is necessary to press the surface of the liquid crystal display panel with this projected object.

As another inspecting method, there is a method of inspection by pin-pointing the gap with an interference membrane thickness gauge or the like. For carrying out the inspection by this method, it is necessary to inspect a large number of points. Therefore, this method has been inconvenient in that it takes a long time for inspecting each one liquid crystal display panel.

SUMMARY OF THE INVENTION

In the view of the above problems, it is an object of the present invention to provide an inspecting method and an inspecting apparatus for inspecting a liquid crystal display panel, capable of automatically carrying out an inspection of the uniformity of a gap between the two glass plates that hold a liquid crystal of the liquid crystal display panel.

According to an aspect of the present inspection, there is provided a liquid crystal display panel inspecting method for inspecting non-uniformity of a gap between two glass plates that hold a liquid crystal of the liquid crystal display panel, wherein non-uniformity of the gap is inspected by picking up with a CCD camera an RGB image formed on the surface of a liquid crystal display panel to be inspected and then by analyzing color non-uniformity of a picked-up image.

According to another aspect of the present inspection, there is provided a liquid crystal display panel inspecting apparatus for inspecting non-uniformity of a gap between two glass plates that hold a liquid crystal of the liquid crystal display panel, wherein non-uniformity of the gap is inspected by picking up with a CCD camera an RGB image formed on the surface of a liquid crystal display panel to be inspected and then by analyzing color non-uniformity of a picked-up image.

There is a correlation among Newton rings on the surface of the liquid crystal display panel, an actual measured value of a gap between two glass plates that hold a liquid crystal of the liquid crystal display panel and an RGB image taken in by a CCD camera. According to the present invention, since an RGB image formed on the surface of a liquid crystal display panel to be inspected is picked up with a CCD camera and color non-uniformity of the picked-up image is analyzed, it is possible to automatically inspect the uniformity of the gap between the two glass plates that hold the liquid crystal of the liquid crystal display panel.

DETAILED DESCRIPTION OF THE PREFERRED EMBODIMENT

Embodiments of an inspecting method and an inspecting apparatus for inspecting a liquid crystal display panel according to the present invention will be explained below with reference to the drawings.

Figure 1:
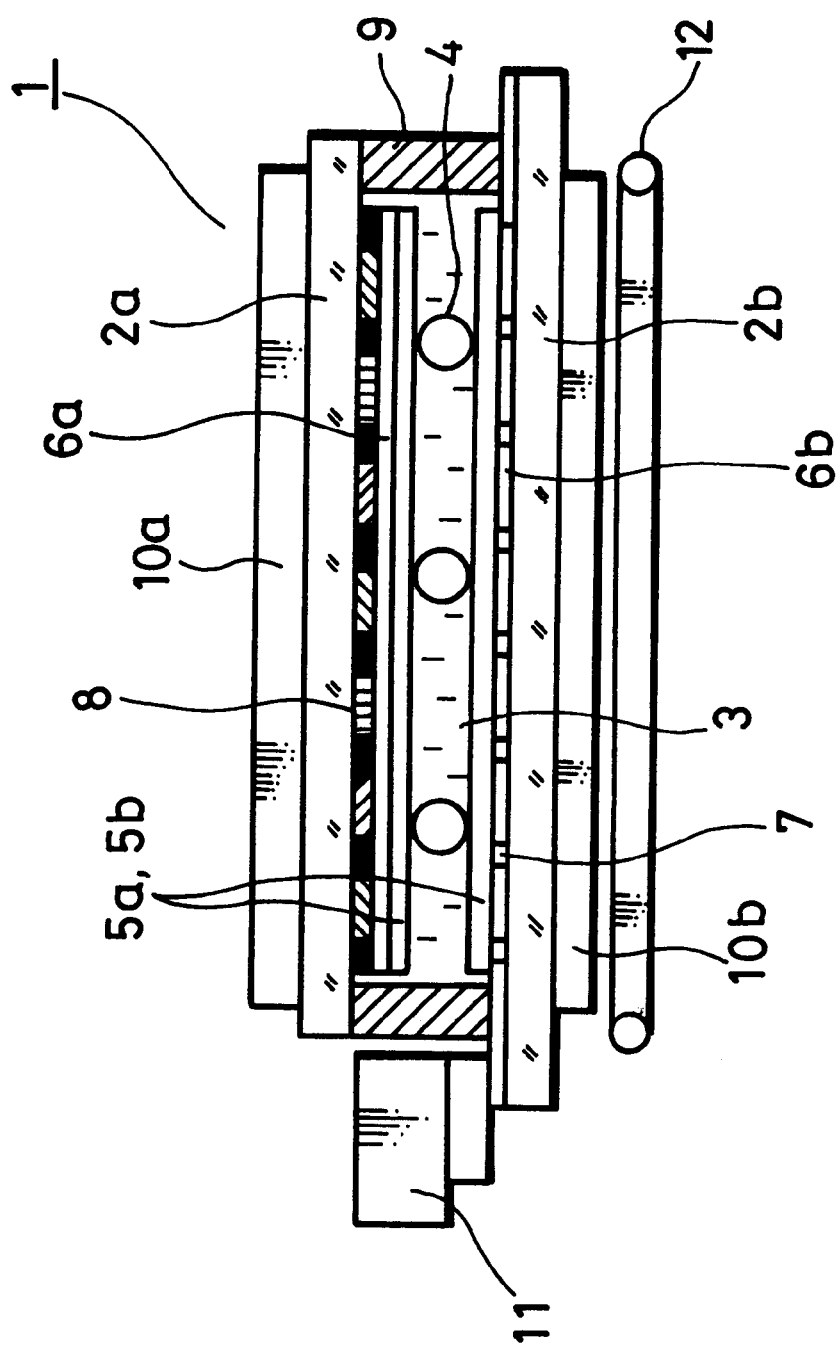
FIG. 1 is a schematic view for explaining a general configuration of the liquid crystal display panel.
Figure 2:
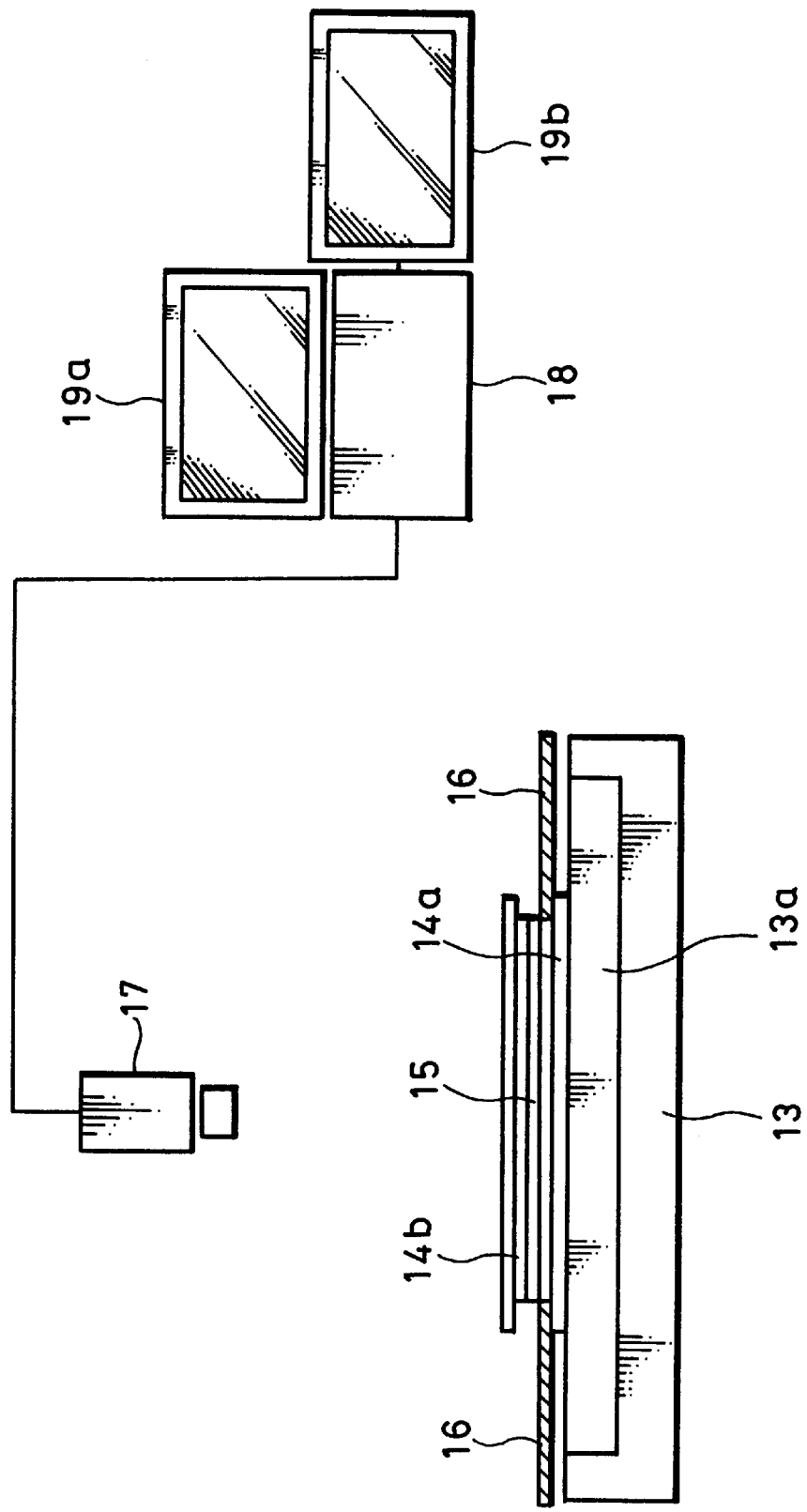
FIG. 2 is a configuration diagram for showing an example of an embodiment of a liquid crystal display panel inspecting apparatus according to the present invention.
Figure 3:
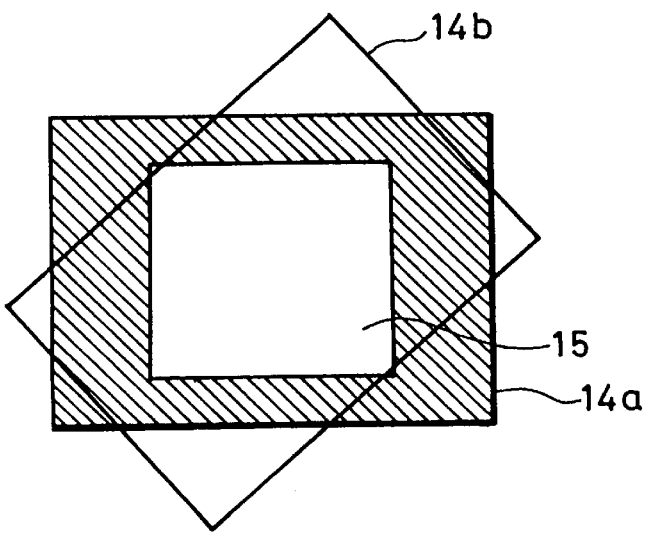
FIG. 3 is a top plan view for showing an example of a key part of the liquid crystal display panel inspecting apparatus according to the present invention.

FIG. 2 shows an apparatus for inspecting a liquid crystal display panel according to one embodiment of the invention. In the liquid crystal display panel inspecting apparatus shown in FIG. 2, there is provided an illumination unit 13 equipped with a light diffusion plate 13a for irradiating a light onto an LCD panel 15 to be inspected. A first polarization plate 14a is provided on the light diffusion plate 13a of the illumination unit 13. A work to be inspected, or the LCD panel 15 to be inspected, is mounted on this first polarization plate 14a. Further, a second polarization plate 14b is mounted on the LCD panel 15 to be inspected. A reference numeral 16 denotes a light shielding plate provided to cover the LCD panel 15 so as to prevent the light from the illumination unit 13 from entering the LCD panel 15.

In other words, the LCD panel 15 to be inspected is disposed between the first and second polarization plates 14a and 14b. In the present embodiment, the first and second polarization plates 14a and 14b are disposed such that the angle of the upper second polarization plate 14b can be adjusted with respect to the lower first polarization plate 14a so that color non-uniformity can be observed clearly.

More specifically, as shown in FIG. 2, for example, the second polarization plate 14b mounted on the LCD panel 15 is set rotatable with respect to the first polarization plate 14a so that the transmission light quantity of the illumination light transmitted from the illumination unit 13 below the first polarization plate 14a can be changed and color non-uniformity can be observed clearly.

Further, an image of the color non-uniformity of the LCD panel 15 is picked up with a CCD camera 17 installed on an axis perpendicular to the surface of the LCD panel 15. An image signal of the picked-up image of the color non-uniformity (an RGB image) of the LCD panel 15 is taken into an image processing unit 18. The image of an inspection result is processed and a predetermined operation is carried out by the image processing unit 18. Then, a resultant inspection result is displayed on monitors 19a and 19b.

In the present embodiment, since there is a correlation among Newton rings on the surface of the LCD panel 15, a measured value of a gap between the two glass plates 2a and 2b that hold the liquid crystal material 3 of the LCD panel 15, and an RGB image taken in by the CCD camera 17, the image processing unit 18 inspects the uniformity of the gap between the two glass plates 2a and 2b that hold the liquid crystal material 3 of the LCD panel 15 measured from this correlation.

The correlation among the Newton rings on the surface of the LCD panel 15, the measured value of a gap between the two glass plates 2a and 2b that hold the liquid crystal material 3 of the LCD panel 15 and the RGB image taken in by the CCD camera 17 will be explained below.

At first, in order to confirm a correlation between a gap between the two glass plates 2a and 2b that hold the liquid crystal material 3 of the LCD panel 15 (hereinafter to be referred to as a cell-gap of the LCD panel 15) and Newton rings on the surface of the LCD panel 15, cell-gaps were measured by a measuring unit for eleven samples of the LCD panels 15 which are, for example, high-temperature process p-Si-type TFT-LCD panels (with 1.8 inch size), and actual measured values were obtained. At the same time, luminance values of the LCD panels 15 were obtained for color non-uniformity collected by the CCD camera 17, and Newton rings were obtained under a sodium lamp. Then, a correlation between these values was studied.

Figure 4:
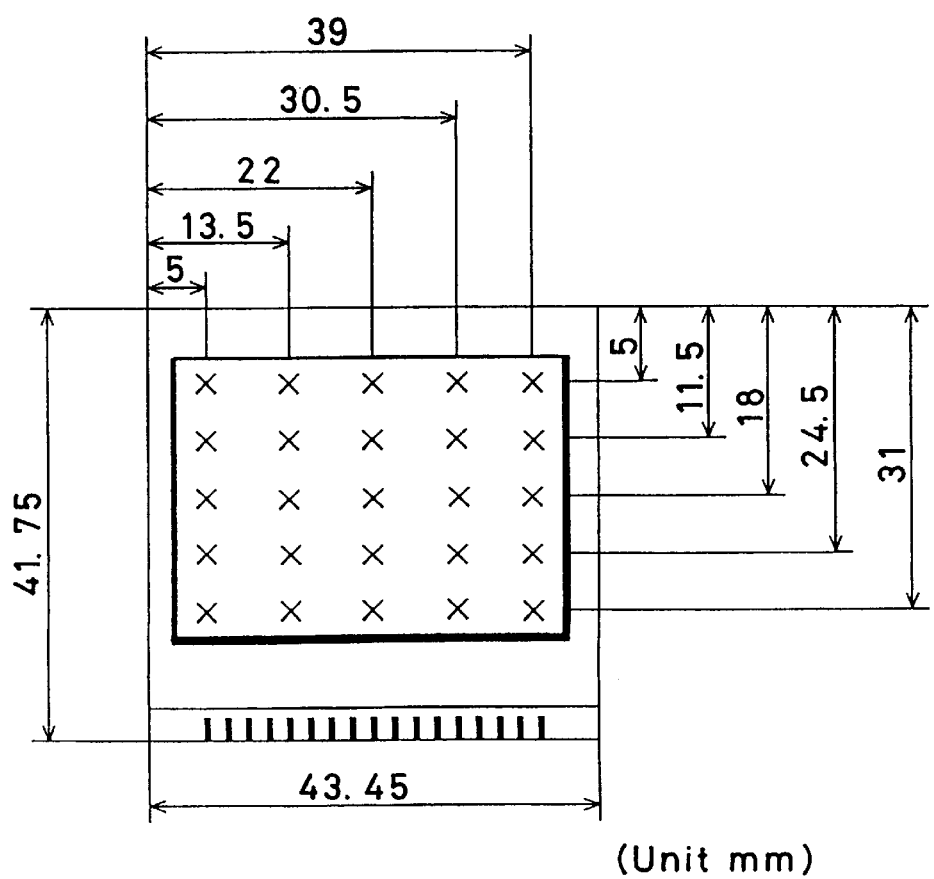
FIG. 4 is an explanatory view for showing cell-gap measuring points on the surface of a liquid crystal display panel.

As a method of measurement as shown in FIG. 4, 25 points were set on each sample LCD panel, that is, five points in a vertical direction and five points in a lateral direction, or, 5×5=25 points in total. Then, the cell-gap was measured for each of the 25 points by the measuring unit. A result of actual measured values of the cell-gaps is as shown in Table 1.

TABLE 1

Comparison Table for Sample 1

| | Gap Measured Value | Luminance Value (Red) | Luminance Value (Green) | Luminance Value (Blue) |
|---|---|---|---|---|
| Sample 1 | 3.191 | 131 | 27 | 77 |
| | 3.152 | 134 | 20 | 64 |
| | 3.222 | 151 | 25 | 51 |
| | 3.216 | 115 | 11 | 81 |
| | 3.307 | 94 | 16 | 102 |
| | 3.154 | 115 | 25 | 91 |
| | 3.028 | 154 | 32 | 48 |
| | 3.091 | 152 | 30 | 52 |
| | 3.165 | 120 | 12 | 78 |
| | 3.34 | 88 | 18 | 104 |
| | 3.316 | 90 | 24 | 104 |
| | 3.054 | 132 | 20 | 70 |
| | 3.069 | 142 | 20 | 54 |
| | 3.252 | 106 | 14 | 90 |
| | 3.43 | 69 | 25 | 111 |
| | 3.38 | 74 | 18 | 118 |
| | 3.207 | 90 | 14 | 94 |
| | 3.181 | 108 | 14 | 78 |
| | 3.32 | 96 | 16 | 84 |
| | 3.427 | 81 | 31 | 113 |
| | 3.406 | 82 | 26 | 108 |
| | 3.436 | 69 | 9 | 105 |
| | 3.405 | 70 | 6 | 106 |
| | 3.388 | 72 | 12 | 104 |
| | 3.38 | 78 | 16 | 104 |
| Average Value | 3.26068 | 104.52 | 19.24 | 87.64 |
| Coefficient of Correlation (B&) | | −0.9102283 | −0.2797227 | 0.87902883 |

For each of the same sample LCD panels, an image of the panel surface of the LCD panel was picked up with the CCD camera 17, and luminance values of RGB for the 25 points were measured with color emphasis, by the inspecting apparatus, as shown in FIG. 2. A result of the measurement is as shown in Table 1.

The second polarization plate 14b located on the LCD panel 15 is set to have a polarization angle of 0 degree with respect to the first polarization plate 14a disposed beneath the LCD panel 15, for all the cases, to make it possible to carry out a consistent evaluation of all the LCD panels 15 inspected.

Coefficients of correlation were calculated based on the data obtained in the above, and a result thereof is shown as the Coefficient of Correlation in Table 1.

Figure 5:
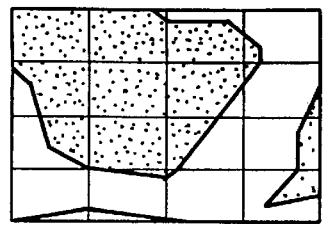
FIG. 5 is a schematic view for showing a pseudo-display of a result of cell-gap measured values.
Figure 5:
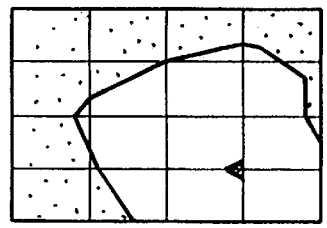
Figure 5:
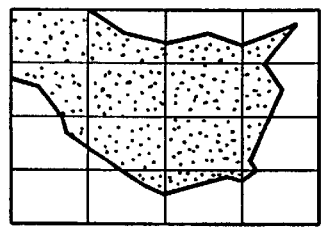
Figure 5:
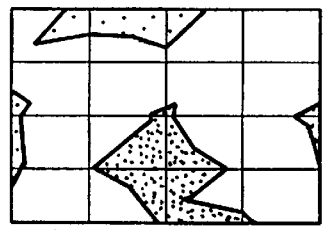
Figure 5:
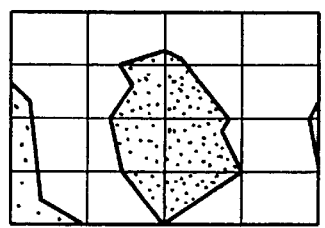
Figure 5:
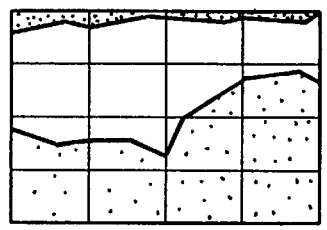
Figure 5:
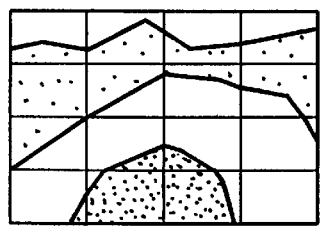
Figure 5:
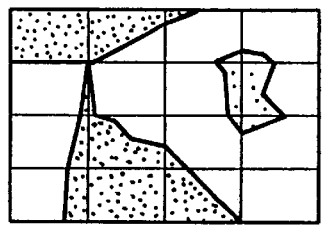
Figure 5:
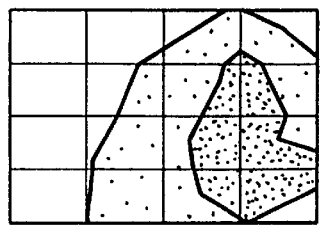
Figure 5:
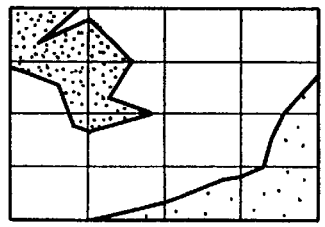
Figure 5:
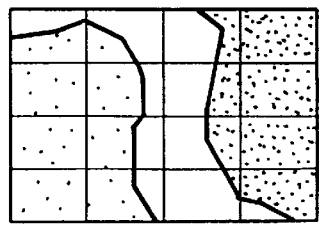

FIG. 5 shows a pseudo-display of the result of the cell-gaps for the eleven samples measured by the measuring unit.

Figure 6:
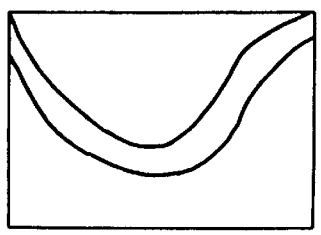
FIG. 6 is a schematic view for showing sketches of Newton rings appearing on the surface of the liquid crystal display panels.
Figure 6:
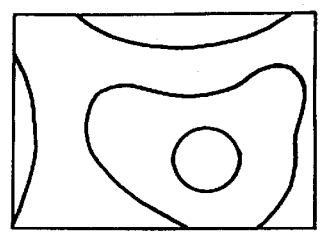
Figure 6:
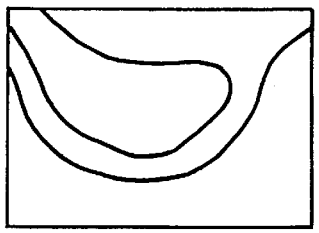
Figure 6:
Figure 6:
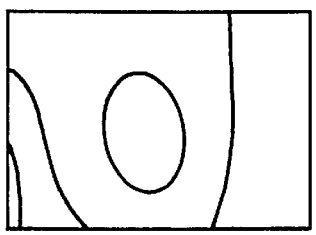
Figure 6:
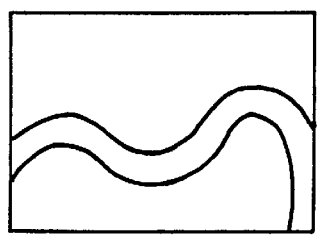
Figure 6:
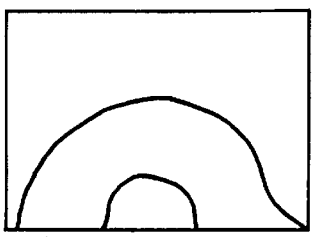
Figure 6:
Figure 6:
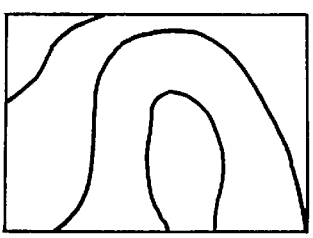
Figure 6:
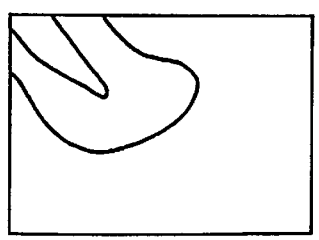
Figure 6:
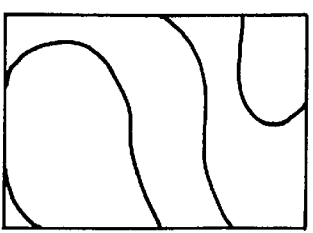

When each of the eleven samples shown in FIG. 5 is compared with each corresponding one of sketches of eleven Newton rings shown in FIG. 6, it is known that the Newton rings of each sample reflect the characteristics of the pseudo-display of measured values of the cell-gaps shown in FIG. 5. This indicates that there is a correlation between the Newton rings and the cell-gaps.

Because the number of the measuring points of the cell-gaps of each LCD panel 15 is 25, this number cannot be said to be sufficient to represent a correlation between the Newton rings and the pseudo-display of the measured values of the cell-gaps. However, when the number of measuring points is further increased, shapes in both FIG. 5 and FIG. 6 will form closer images.

However, the cell-gap measuring unit currently available requires a manual adjustment of the points to be measured, and it is not realistic to increase the measuring points any more.

Figure 7:
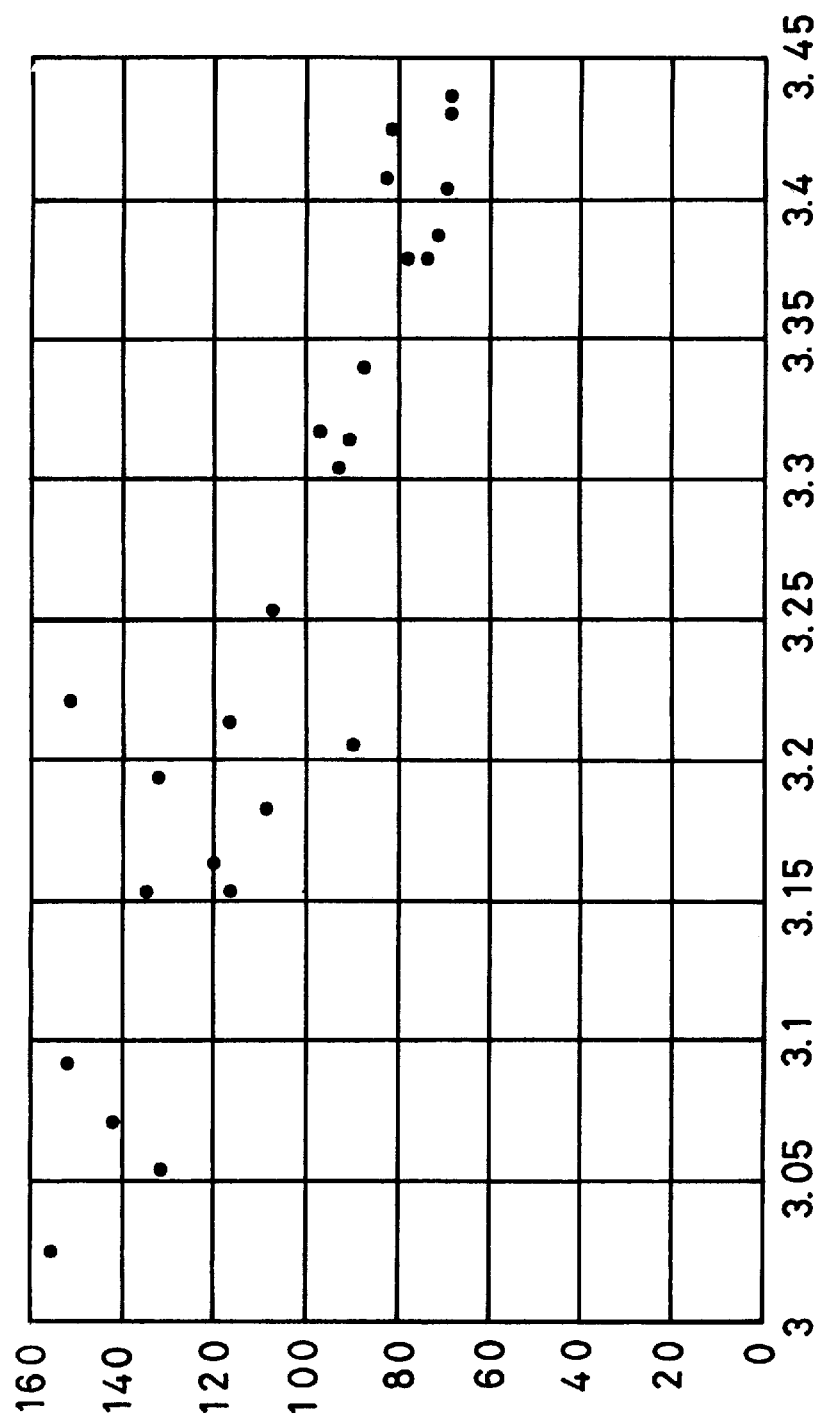
FIG. 7 is a dispersion diagram for showing a relationship between cell-gaps and luminance values of Sample 1.

While the eleven LCD panels were sampled in this embodiment, a dispersion diagram of Sample 1 is shown in FIG. 7. Samples 2 to 11 can also be expressed in a similar manner but they are omitted here. In FIG. 7, the horizontal axis or abscissa represents values obtained by the cell-gap measuring unit, and the vertical axis or ordinate represents luminance values here on the image. The unit of the cell-gap measured values here is μm.

When a correlation between the cell-gap values and the luminance values is looked at for the eleven LCD panels, it was known that almost all the LCD panels have a high correlation with a coefficient of correlation of 0.9 or above between the cell-gap measured values and the luminance values of one of the colors among the RGB luminance values.

Figure 8:
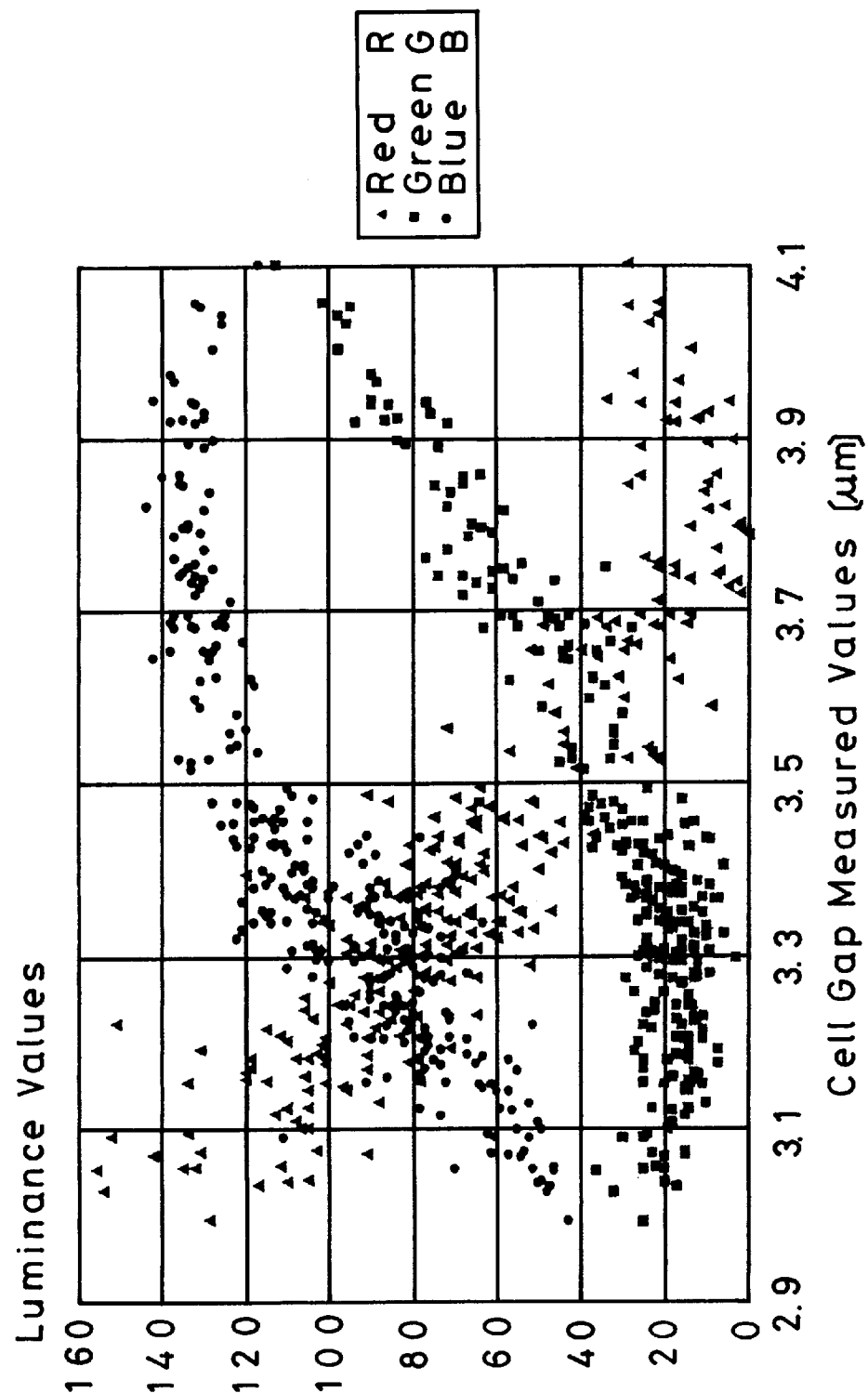
FIG. 8 is a graph for showing a relationship between gap values and RGB luminance values for the whole panels (the total number of sample panels, 11)

FIG. 8 is a dispersion diagram for showing in one graph the whole data obtained in the above-described manner, that is, a result of measuring the eleven LCD panels by obtaining data of 25 points for each one sample LCD panel (that is, the data of 25× 11=275 points).

As is clear from FIG. 8, when the gap measured values are 3.5 μm or below, there is a negative correlation between the red color R and the cell-gap values, there is a positive correlation between the blue color B and the cell-gap values, and there is no correlation between the green color G and the cell-gap values. When the gap measured values are equal to or more than 3.5 μm, there is no correlation between the blue color B and the cell-gap values, but there is a positive correlation between the green G and the cell-gap values.

Figure 9:
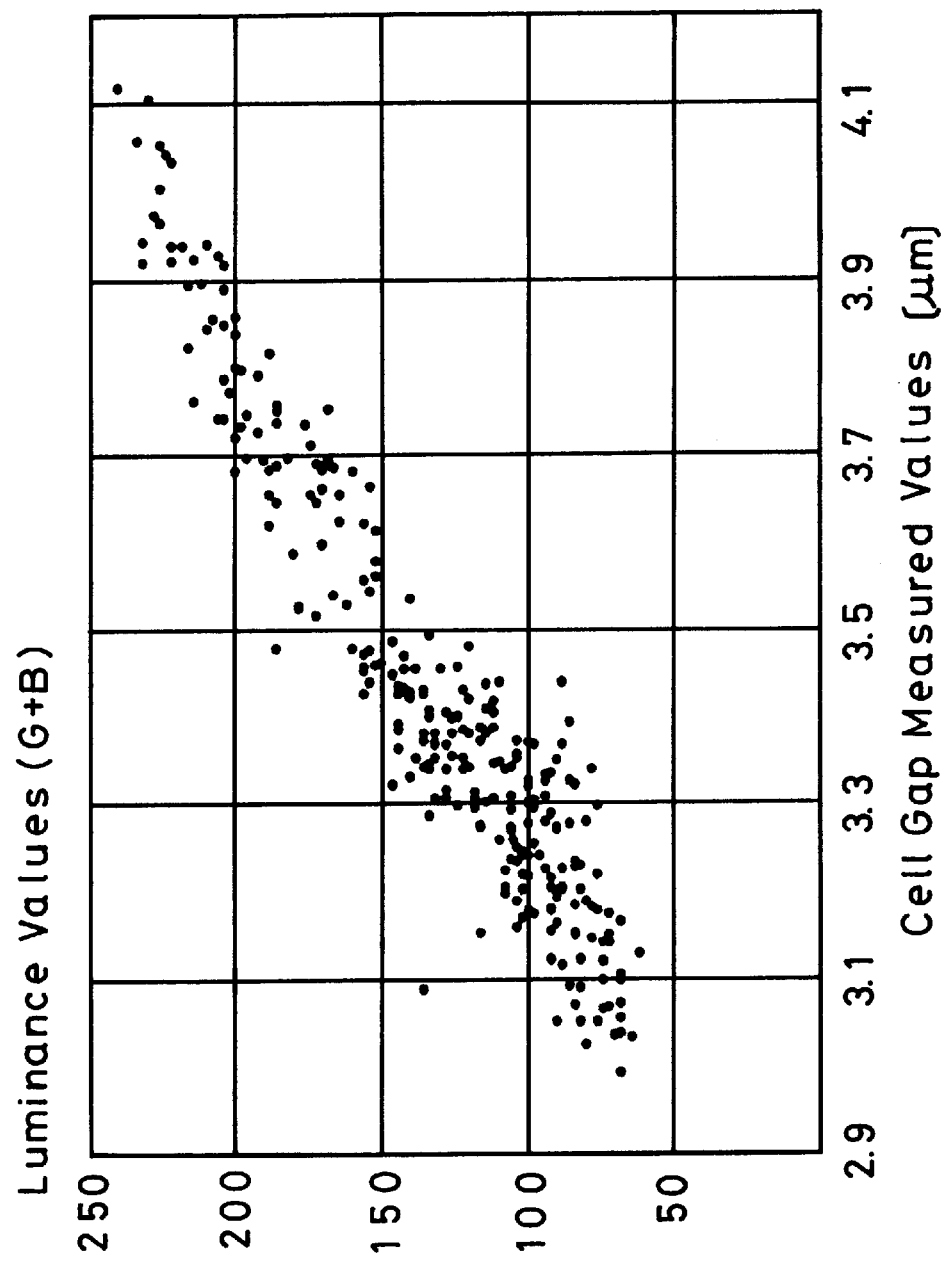
FIG. 9 is a graph for showing a relationship between gap values and (G+B) luminance values for the whole panels.

FIG. 9 shows a result of plotting the sum of the luminance values of the blue color B and the luminance values of the green color G, that is (G+B), among the RGB luminance values shown in FIG. 8. This indicates that there is a correlation between the cell-gap values and the luminance values in all the gap ranges.

Figure 10:
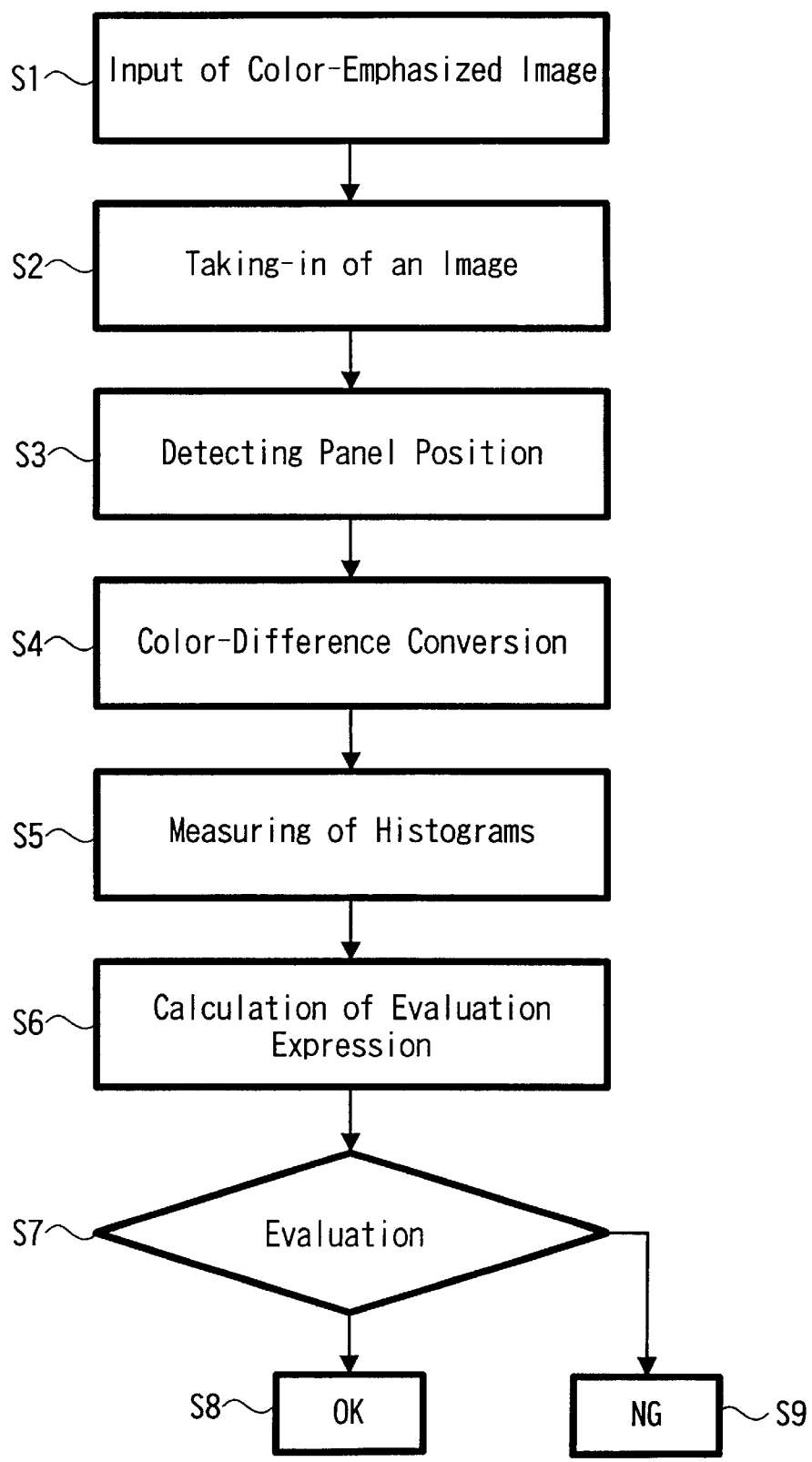
FIG. 10 is a flowchart of an image processing operation of the liquid crystal display panel inspecting apparatus according to the present invention.

The inspection of uniformity of the cell-gaps in the LCD panel 15 will be explained next with reference to a flowchart shown in FIG. 10.

At first, an image processing is carried out to prepare a color-emphasized input image in step S1. Next, the process goes to step S2, in which the image is taken in.

Next, the process proceeds to step S3 in which the position of the LCD panel 15 is detected. Then, the process proceeds to step S4 in which the RGB luminance values are converted into a luminance signal Y and color-difference signals (R−Y) and (B−Y) by color-difference conversion. Next, the process proceeds to step S5 in which histograms of the color difference signals (R−Y) and (B−Y) are calculated for an image inspection area.

In the next step S6, the histograms obtained in the above calculation are approximated into a normal distribution function having two peaks. An inter-peak distance d is calculated from the peaks obtained.

The inter-peak distance d is as follows:

$$d=\{(P1^{R-Y}-P2_{R-Y})^2+(P1_{B-Y}-P2_{B-Y})^2\}^{1/2}$$

After finishing the calculation of the inter-peak distance d, the process proceeds to step S7 where the inter-peak distance d obtained in the above calculation is evaluated and a pass/failure decision is made. When a pass decision has been made, OK is displayed in the next step S8. When a failure decision has been made, NG is displayed in step S9.

As described above, there is a correlation among the input on the surface of the liquid crystal display panel 15, the practical measured values of the gaps between the two glass plates 2a and 2b that hold the liquid crystal material 3 of this liquid crystal display panel 15, and the RGB image taken in by the CCD camera 17. According to the present embodiment, since the RGB image formed on the surface of the liquid crystal display panel 15 to be inspected is picked up with the CCD camera 17 and the color non-uniformity of the image obtained is analyzed, it is possible to automatically carry out the inspection of the uniformity of the gaps between the two glass plates 2a and 2b that hold the liquid crystal material of this liquid crystal display panel 15.

It is needless to mention that the present invention is not limited to the above-described configuration but also can take various other types of configurations within the scope of the gist of the present invention.

According to the present invention, because the image of the liquid crystal display panel surface is picked up with the CCD camera and the uniformity of the cell-gaps of the liquid crystal display (LCD) panel is inspected by image processing, it is possible to automatically carry out the inspection of the cell-gaps of the liquid crystal display panel.

At the time of the inspection, the liquid crystal display panel to be inspected is sandwiched between the two polarization plates and a relative angle formed by these polarization plates is adjusted. Therefore, color non-uniformity can be observed clearly, which enables a high-precision inspection to be achieved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A liquid crystal display panel inspecting method for inspecting non-uniformity of a gap between two glass plates that hold a liquid crystal of a liquid crystal display panel, wherein non-uniformity of the gap is inspected by picking up with a CCD camera an RGB image formed on the surface of the liquid crystal display panel to be inspected and then by analyzing color non-uniformity of a picked-up image.

2. A liquid crystal display panel inspecting method according to claim 1, comprising the steps of:

taking in an image;

detecting a position of a liquid crystal display panel;

converting RGB luminance values into a luminance signal and color difference signals;

calculating luminance histograms of the color difference signals for an image inspection area;

approximating the histograms obtained in the above step into a normal distribution function having two peaks; and calculating an inter-peak distance from the peaks obtained in the above step; and evaluating the inter-peak distance obtained from the above step and deciding on a pass or a failure.

3. A liquid crystal display panel inspecting apparatus for inspecting non-uniformity of a gap between two glass plates that hold a liquid crystal of a liquid crystal display panel, wherein non-uniformity of the gap is inspected by picking up with a CCD camera an RGB image formed on the surface of the liquid crystal display panel to be inspected and then by analyzing color non-uniformity of a picked-up image.

4. A liquid crystal display panel inspecting apparatus according to claim 3, wherein the liquid crystal display panel to be inspected is disposed between two polarization plates, an illumination light is irradiated from one side of one of the polarization plates, a CCD camera disposed at the other side of the other polarization plate picks up an image of the surface of the liquid crystal display panel, and a relative angle between the two polarization plates is changed to adjust to make it possible to clearly observe color non-uniformity.

* * * * *